United States Patent
Sadasivam et al.

(10) Patent No.: US 10,732,694 B2
(45) Date of Patent: Aug. 4, 2020

(54) POWER STATE CONTROL OF A MOBILE DEVICE

(71) Applicant: QUALCOMM Incorporated, San Diego, CA (US)

(72) Inventors: Shankar Sadasivam, San Diego, CA (US); Jin Won Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 189 days.

(21) Appl. No.: 15/713,254

(22) Filed: Sep. 22, 2017

(65) Prior Publication Data

US 2019/0094941 A1 Mar. 28, 2019

(51) Int. Cl.
  *G06F 1/3212* (2019.01)
  *G06F 1/324* (2019.01)
  *G06F 1/3287* (2019.01)
  *G06F 9/50* (2006.01)

(52) U.S. Cl.
  CPC ............ *G06F 1/3212* (2013.01); *G06F 1/324* (2013.01); *G06F 1/3287* (2013.01); *G06F 9/5094* (2013.01)

(58) Field of Classification Search
  CPC ...... G06F 1/3212; G06F 1/324; G06F 1/3287; G06F 9/5094
  USPC .......................... 713/320, 322, 300; 709/224
  See application file for complete search history.

(56) References Cited

U.S. PATENT DOCUMENTS

| | | | | |
|---|---|---|---|---|
| 7,017,060 | B2 * | 3/2006 | Therien | G06F 1/3203 713/320 |
| 7,228,546 | B1 * | 6/2007 | McCarthy | G06F 9/5061 718/103 |
| 8,707,314 | B2 * | 4/2014 | Gummaraju | G06F 9/5044 718/102 |
| 8,972,760 | B1 * | 3/2015 | Zajac | G06F 1/3212 713/320 |
| 2006/0026447 | A1 * | 2/2006 | Naveh | G06F 1/3203 713/322 |
| 2008/0022284 | A1 | 1/2008 | Cherkasova et al. | |
| 2008/0162770 | A1 * | 7/2008 | Titiano | G06F 1/3203 710/309 |

(Continued)

FOREIGN PATENT DOCUMENTS

| | | |
|---|---|---|
| EP | 2765481 A1 | 8/2014 |
| WO | 2016130282 A1 | 8/2016 |

(Continued)

OTHER PUBLICATIONS

International Search Report and Written Opinion—PCT/US2018/051118—ISA/EPO—dated Jan. 4, 2019.

(Continued)

*Primary Examiner* — Aurel Prifti

(74) *Attorney, Agent, or Firm* — Arent Fox, LLP

(57) ABSTRACT

A method of operating a shared resource in a mobile device includes extracting a set of features from a plurality of subsystems of the mobile device. The set of features may be extracted from each subsystem of the plurality of subsystems requesting services from one or more shared resources of the mobile device. One or more parameter of the shared resource(s) may be determined based on the extracted set of features from the plurality of subsystems. The shared resource(s) may be operated based on the determined parameter(s).

12 Claims, 9 Drawing Sheets

(56) References Cited

U.S. PATENT DOCUMENTS

| | | | |
|---|---|---|---|
| 2009/0217277 A1* | 8/2009 | Johnson | G06F 1/3203 |
| | | | 718/102 |
| 2011/0157195 A1 | 6/2011 | Sprangle et al. | |
| 2012/0216200 A1 | 8/2012 | Vaidyanathan et al. | |
| 2013/0185581 A1 | 7/2013 | Michalak et al. | |
| 2014/0089700 A1* | 3/2014 | Chang | G06F 9/5094 |
| | | | 713/322 |
| 2014/0143557 A1* | 5/2014 | Kuesel | G06F 1/26 |
| | | | 713/300 |
| 2014/0310407 A1* | 10/2014 | Zhang | G06Q 10/1091 |
| | | | 709/224 |
| 2014/0373024 A1 | 12/2014 | Watts et al. | |
| 2015/0355692 A1 | 12/2015 | Paul et al. | |
| 2015/0355700 A1* | 12/2015 | Pusukuri | G06F 1/329 |
| | | | 713/323 |
| 2016/0239074 A1 | 8/2016 | Lee et al. | |
| 2016/0259562 A1 | 9/2016 | Wells et al. | |
| 2016/0291665 A1* | 10/2016 | Wang | G06F 1/3209 |
| 2017/0060222 A1 | 3/2017 | Lee et al. | |
| 2017/0293340 A1* | 10/2017 | Park | G06F 1/3265 |
| 2018/0260229 A1* | 9/2018 | Masters | G06F 1/3225 |
| 2018/0284879 A1* | 10/2018 | Gorbatov | G06F 15/7807 |
| 2019/0004585 A1* | 1/2019 | Halverson | G06F 1/3206 |

FOREIGN PATENT DOCUMENTS

| | | |
|---|---|---|
| WO | 2017067586 A1 | 4/2017 |
| WO | 2017112866 A1 | 6/2017 |

OTHER PUBLICATIONS

Rantonen M., et al., "Fuzzy Expert System for Load Balancing in Symmetric Multiprocessor Systems", Expert Systems with Applications, Oxford, GB, vol. 37, No. 12, Dec. 1, 2010 (Dec. 1, 2010), XP027203922, pp. 8711-8720.

Zhuravlev S., et al., "Survey of Energy-Cognizant Scheduling Techniques", IEEE Transactions on Parallel and Distributed Systems, IEEE Service Center, Los Alamitos, CA, US, vol. 24, No. 7, Jul. 1, 2013 (Jul. 1, 2013), XP011511142, pp. 1447-1464.

* cited by examiner

POWER STATE CONTROL OF A MOBILE DEVICE

BACKGROUND

Field

Certain aspects of the present disclosure generally relate to machine learning and, more particularly, to improving systems and methods of power state control of a mobile device.

Background

Mobile devices (e.g., smart phones, tablet compute devices, smart speakers, connected home cameras, Internet of Things (IoT) devices such as a smart refrigerator, etc.) have numerous shared resources such as a memory component, network on chip (NOC), a central processing unit (CPU) and a graphics processing unit (GPU), for example. Each of the share resources may serve or may be used by numerous applications and subsystems of the mobile device, such as a camera or audio system, for example. However, each of the subsystems, and in turn, the shared resources may have very different workloads and different performance specifications, but are often operated at the same time. As such, it is challenging to determine or set the power state of the various shared resource (e.g., CPU) to serve the various subsystems while preserving the mobile device battery.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Mobile devices (e.g., smart phones, tablet compute devices, smart speakers, connected home cameras, IoT devices in general, e.g., smart refrigerator, etc.) have numerous shared resources such as a memory component, a NOC, a CPU and a GPU, for example. Each of the share resources may serve or may be used by numerous applications and subsystems of the mobile device, such as a camera or audio system, for example. However, each of the subsystems, and in turn, the shared resources may have very different workloads and different performance specifications, but are operated at the same time. As such, it is challenging to determine or set the power state of the various shared resource (e.g., CPU) to serve the various subsystems while preserving the mobile device battery.

To address the issues of battery preservation and device performance, aspects of the present disclosure are directed to power state management of shared resources. In an aspect of the disclosure, a method, a computer-readable medium, and an apparatus of operating a shared resource in a mobile device are provided. The apparatus comprises a memory and at least one processor coupled to the memory. The processor(s) are configured to extract a set of features from a plurality of subsystems of the mobile device. The set of features may be extracted from each subsystem of the plurality of subsystems requesting services from at least one shared resource of the mobile device. The processor(s) are also configured to determine at least one parameter of the at least one shared resource based on the extracted set of features from the plurality of subsystems. Furthermore, the processor(s) are configured to operate the at least one shared resource based on the at least one parameter.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
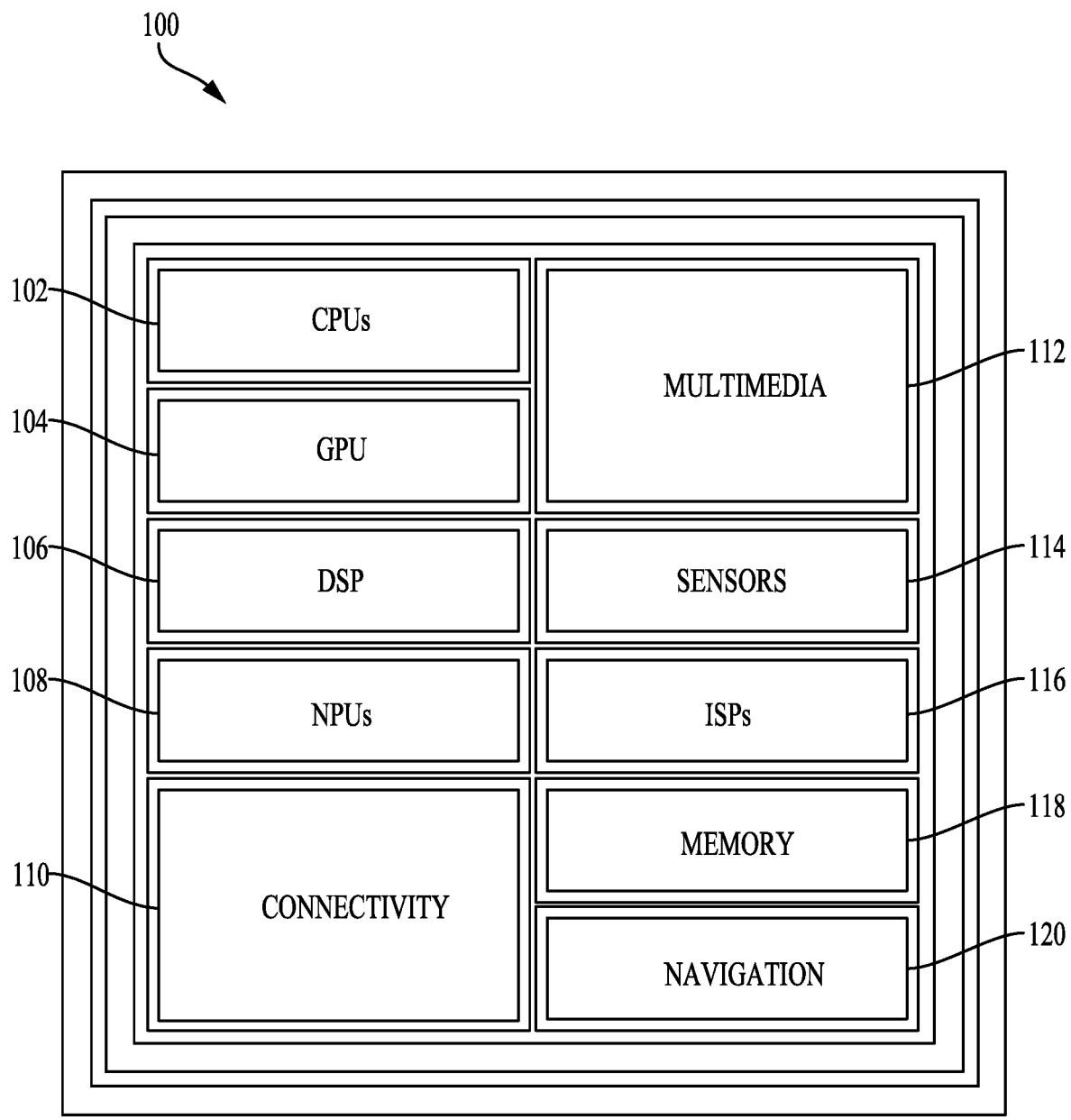
FIG. 1A illustrates an example implementation of power state control using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Power State Control

Mobile devices (e.g., smart phones, tablet compute devices, smart speakers, connected home cameras, IoT devices such as a smart refrigerator, etc.) have numerous shared resources. A shared resource may comprise a device or information that may be accessed by multiple subsystems of a mobile computing device to perform a particular task or operation. For example, a shared resource may comprise a memory component (e.g., a double data rate (DDR) synchronous dynamic random access memory (SDRAM), a GPU, a NOC, a CPU or the like. Each of the share resources may serve or may be used by numerous subsystems of the mobile device, such as a camera, audio system or an application processor, for example. However, each of the subsystems and in turn, the shared resources may have very different workloads and different performance specifications that may adversely impact the power state of the mobile device. For instance, if the power state of the CPU is maintained too high (e.g., via the CPU frequency setting), the CPU performance may be improved, but the battery may drain very quickly, resulting in a poor user experience. As such, it is challenging to determine or set the power state of the shared resource (e.g., CPU) to serve the various subsystems while preserving the mobile device battery.

To address these and other issues, metrics or features of interest for subsystems of the mobile device that characterize demands for a shared resource from the respective subsystems may be used in a feedback control for the resource to manage the usage of the shared resource. In accordance with aspects of the present disclosure, a top-down controller processes the features from all subsystems through reinforcement learning, the outputs of which may be used manage the shared resource (e.g., control the clock levels of the shared resources).

FIG. 1A illustrates an example implementation of the aforementioned power state control using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, $5^{th}$ generation wireless systems (5G), unlicensed Wi-Fi connectivity, USB connectivity, Bluetooth connectivity, and the like, and a multimedia processor 112 that may, for example, detect and recognize gestures, and may be used for streaming media playback. In one implementation, the NPU is implemented in the CPU, DSP, and/or GPU. The SOC 100 may also include a sensor processor 114, image signal processors (ISPs), and/or navigation 120, which may include a global positioning system.

Each of the processing blocks of SOC 100 may comprise a shared resource. That is, applications and other subsystems of a mobile device included in SOC 100 (multimedia block 112 may demand or request access and/or services to be performed by the shared resource.

The SOC 100 may be based on an ARM instruction set. In an aspect of the present disclosure, the instructions loaded into the general-purpose processor 102 may comprise code for extracting a set of features from a plurality of subsystems of the mobile device, each subsystem of the plurality of subsystems requesting services from at least one shared resource of the mobile device. The instructions loaded into the general-purpose processor 102 may also comprise code for determining at least one parameter of the at least one shared resource based on the extracted set of features from the plurality of subsystems. Furthermore, the instructions loaded into the general-purpose processor 102 may comprise code for operating the at least one shared resource based on the at least one parameter.

Figure 1B:
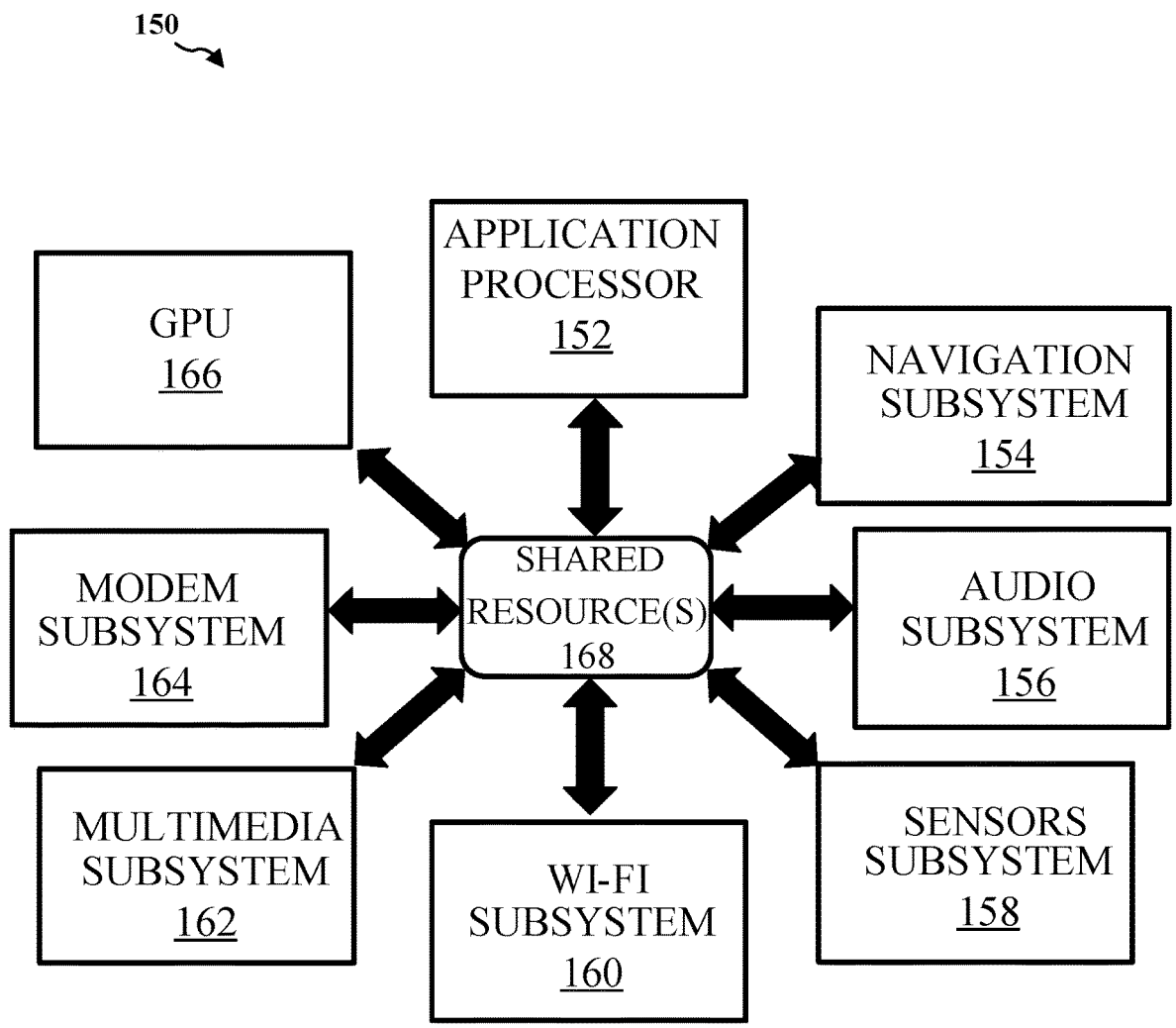
FIG. 1B illustrates an exemplary mobile device configured for power state control in accordance with certain aspects of the present disclosure

FIG. 1B is an exemplary block diagram illustrating architecture of a mobile device in accordance with aspects of the present disclosure. Referring to FIG. 1B, mobile device 150 comprises one or more shared resources as well as various subsystems. Subsystems may include, for example, an audio subsystem 156, a sensor subsystem 158, a multimedia subsystem 162, a modem subsystem 164, and a Wi-Fi subsystem 160. Additionally, mobile device 150 may include an application processor 152, graphics processing unit (GPU) 166, and a navigation subsystem 154. Each of the subsystems may access or request services from one or more shared resources 168. Shared resource may, for example, comprise a CPU or a memory component (e.g., double data rate (DDR) or cache memory), a network on chip (NOC). However, some subsystems may also serve as a shared resource. For instance, the GPU 166 may also be a shared resource that is called on to perform an image processing task or other graphics processing task, for example. However, in performing the image or graphics processing task, the GPU 166 may also serve as a subsystem requesting services from another shared resource such as a CPU or access to a memory address via the memory component.

In accordance with aspects of the present disclosure features may be extracted from each of the subsystem (e.g., multimedia subsystem 162). The features may relate to performance metrics associated with a workload. A workload may include any application, program or related computation to be executed on the mobile device. Additionally, a workload may include an amount of processing to be performed or may relate to a desired level of performance for a specified task. For example, where the task involves accessing a website via a browser, the workload may comprise a desired data transfer speed. In another example, where the task to be performed is displaying a video, the workload may comprise or relate to a desired frame rate for displaying the video.

In some aspects, the workloads from the multiple subsystems may be concatenated or synthesized to more accurately reflect the work to be performed. For example, a where the desired task is to stream a video via the Internet, the task may involve multiple subsystems including the application processor 152, the Wi-Fi subsystem 160, the a modem subsystem 164 and the GPU 166. Each of these subsystems may request services from shared resource 168 (e.g., a CPU or a memory component). Additionally, multiple tasks may be performed at the same time. For instance, during the video playback a text message or a call may be received. Accordingly, multiple workloads for each of the tasks may be produced.

In some aspects, the workload for each shared resources may be categorized and/or combined. For instance, the workload from the application processor 152 and GPU 166 may categorized as computing-type task, while the workload from the modem subsystem 164 and the Wi-Fi subsystem 160 may comprise communication-type workloads.

A set of features may be extracted from each of the subsystems and used to determine a parameter to operate the shared resource 168 to reduce power consumption and/or improve processing efficiency. The features may be the same or may be different for different subsystems. By way of example only, the features for a CPU may include a current CPU frequency, CPU utilization, a number of instructions, a number of cache (e.g. L2 cache) misses per core. The features for a DDR may include current or selected DDR frequency, instantaneous bandwidth (IB) (an indication of the amount of latency that the bus master is willing to tolerate)/average bandwidth (AB) (is an indication of the average throughput of data transfer that the bus master expects to do with the memory) votes from other subsystems, and DDR read/write data rate. The features for GPU may include a selected frequency, utilization, a number of instructions, a number of cache (e.g. L2 cache) misses per core. The features for Wi-Fi/Modem may include transmit and receive packet rate and protocol meta information (e.g., packet header). Of course, the features identified and the subsystems are merely exemplary and in no way exhaustive. Similar and/or additional features may be provided for each of subsystem of the mobile device. The features extracted from multiple subsystems may be used to determine one or more parameters for controlling a shared resource (e.g., CPU). In some aspects, the extracted features may be collected and stored along with information specifying the workload. The stored features and workload information may be used to train a computational network to learn an operational parameter for operating a shared resource (e.g., 168). In some aspect the operational parameter may be optimized such that the power consumption and/or the efficiency of the shared resource and thus the mobile device are improved. In one example, the features and corresponding workload information may be used along with performance information (e.g., time to complete a particular task or operation) to produce a lookup table.

Figure 2:
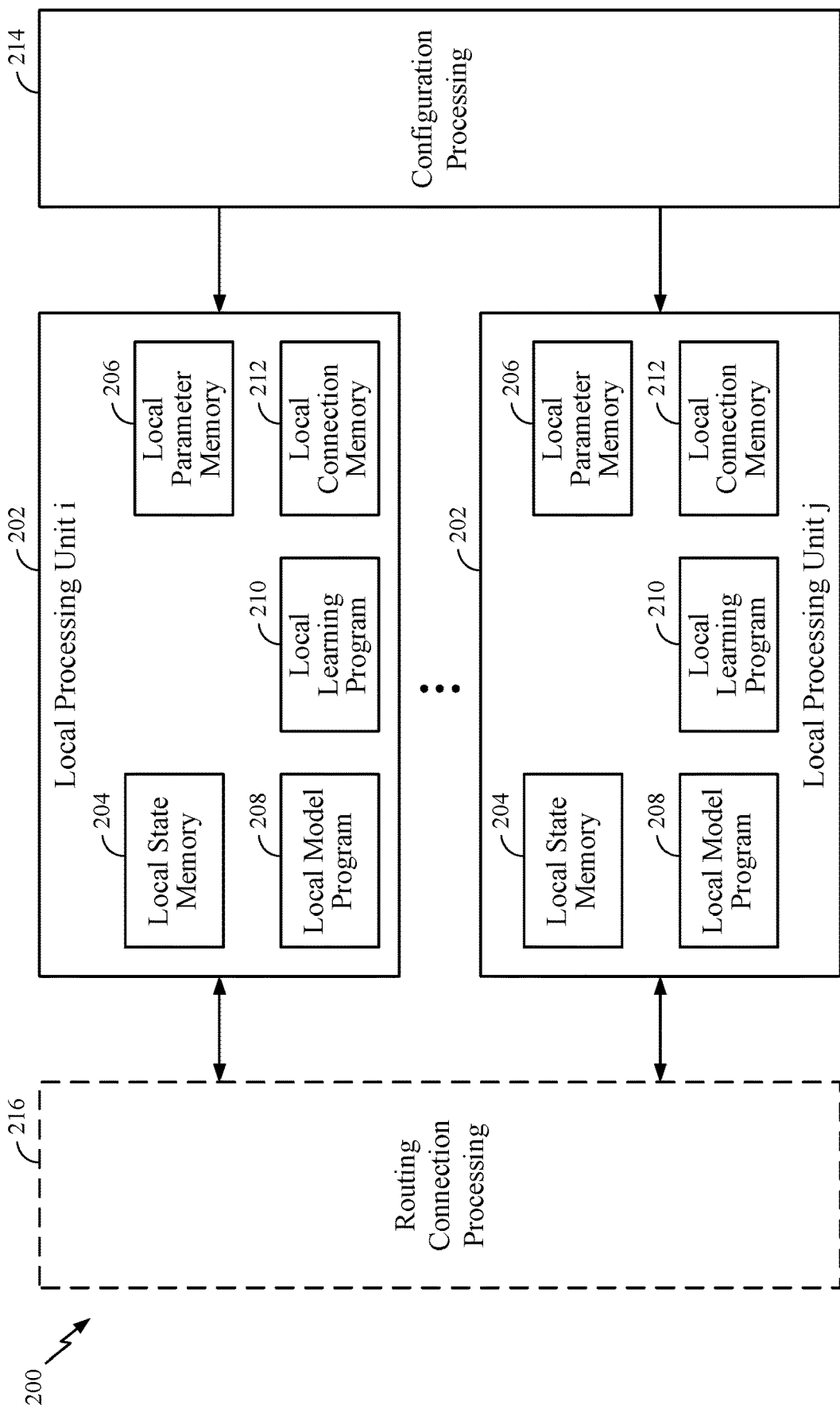
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
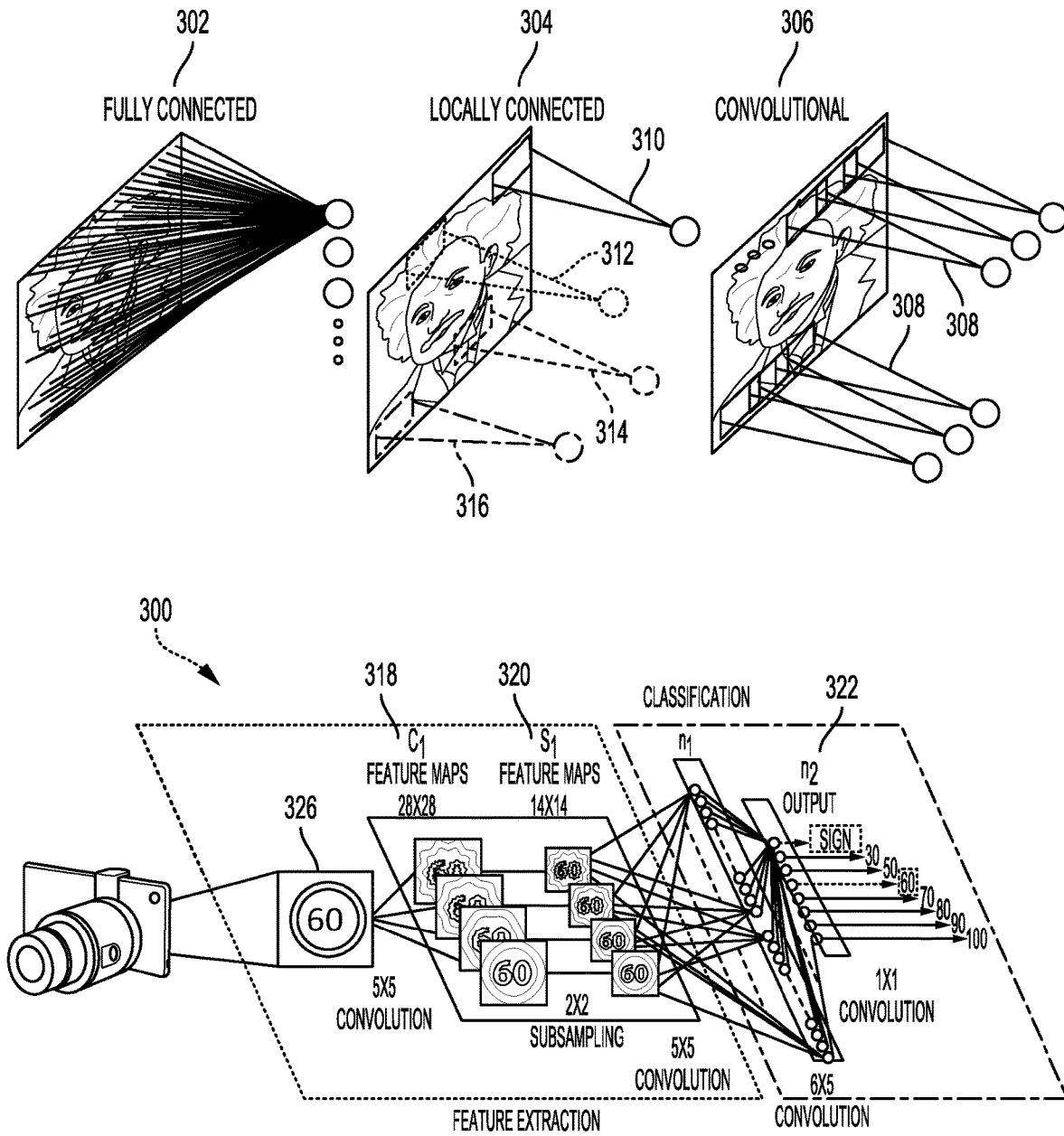
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
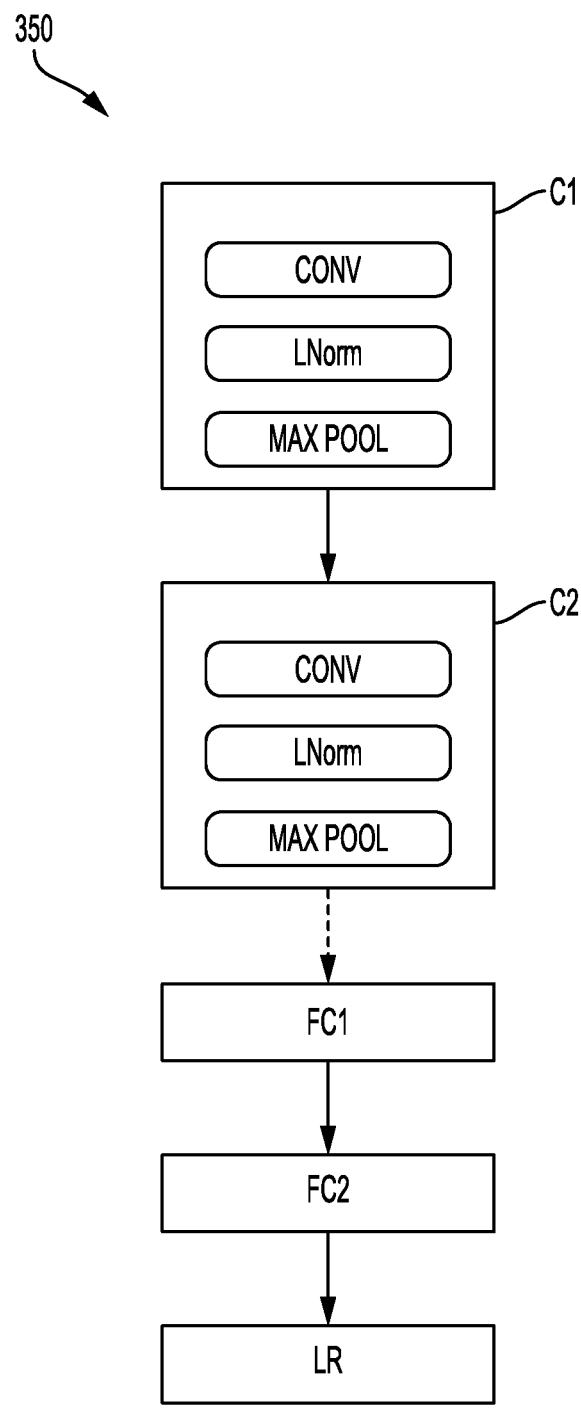
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
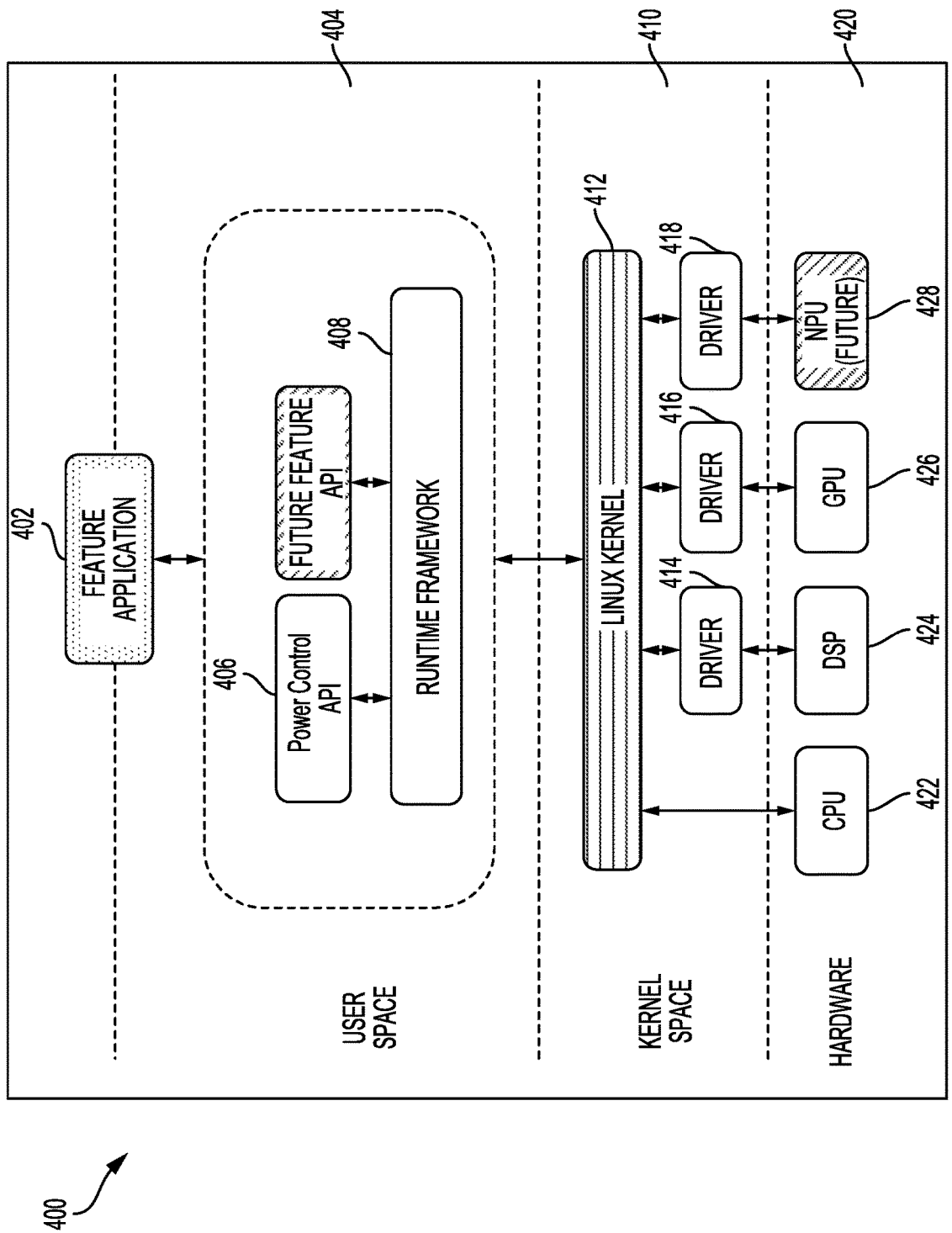
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for management of a shared resource. The AI application 402 may, for example, adjust the clock frequency, and in turn the power consumption of a shared resource (e.g., CPU) differently based on a set of features collected from multiple subsystems associated with a workload (e.g., image processing). The AI application 402 may make a request to compiled program code associated with a library defined in an application programming interface (API) 406 to determine a parameter value (e.g., clock frequency) for the shared resource. This request may ultimately rely on the output of a deep neural network configured to provide parameter estimates based on the workload as well as features (e.g., current CPU frequency, DDR clock frequency, GPU utilization, and Wi-Fi packet rate) collected from each of the subsystems and for example.

A run-time engine 408, which may be compiled code of a Runtime Framework, may be further accessible to the AI application 402. The AI application 402 may cause the run-time engine, for example, to request power management at a particular time interval or triggered by an event detected by the user interface of the application. When caused to manage power of the mobile device, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, features to be extracted therefrom, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
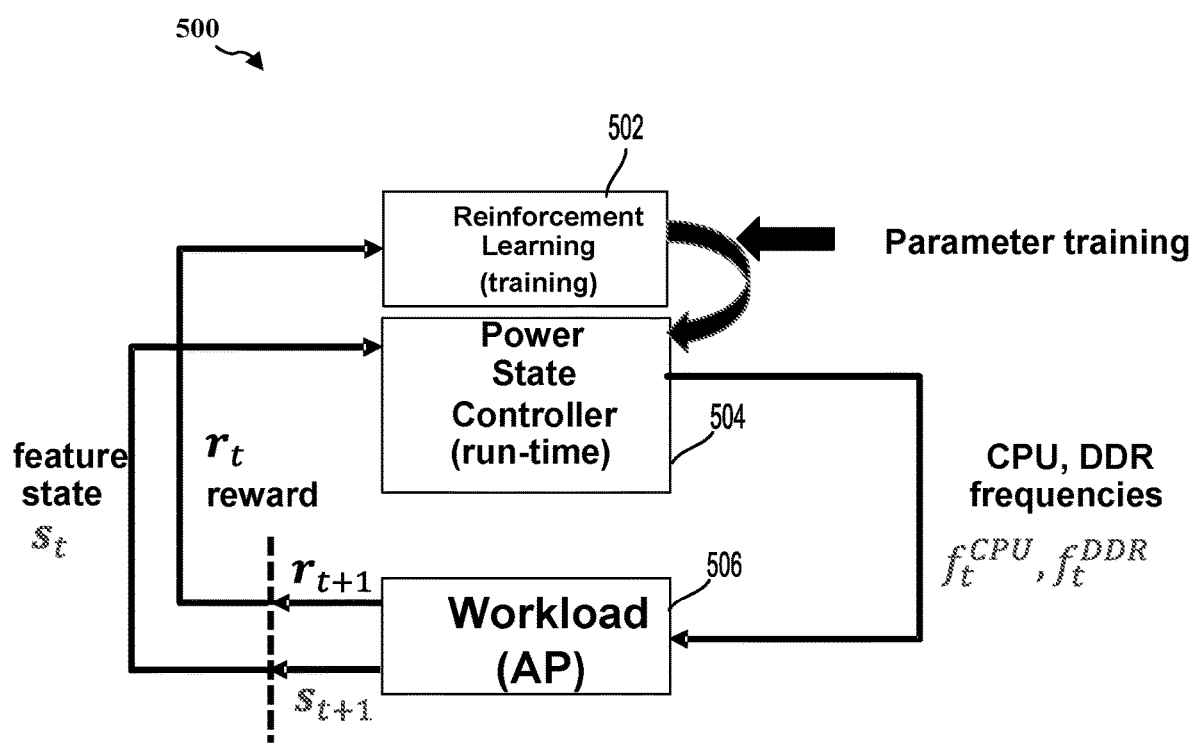
FIG. 5 is a diagram illustrating exemplary operation of the power state controller using reinforcement learning to manage a shared resource.
Figure 6:
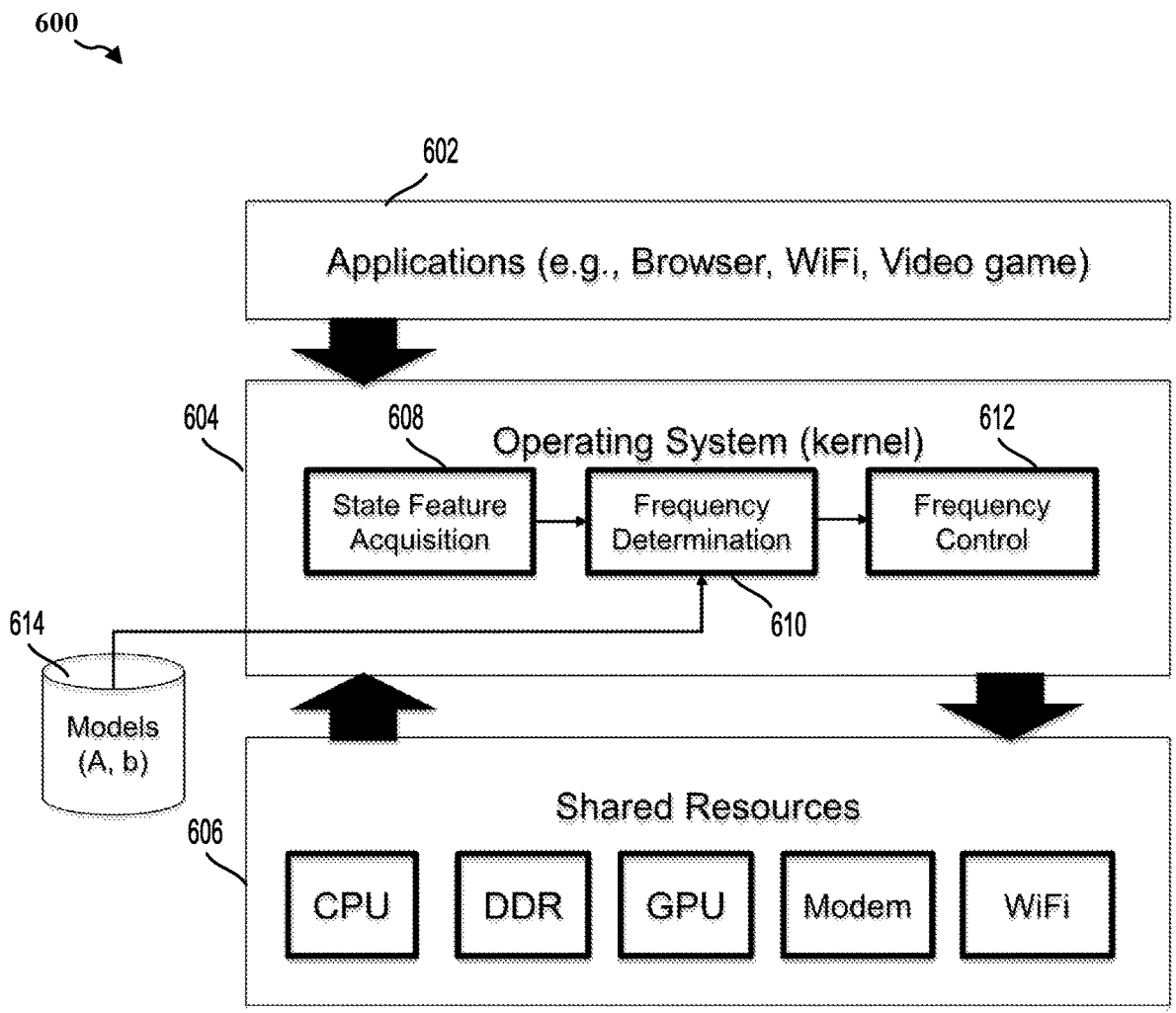
FIG. 6 is a diagram illustrating exemplary architecture for power state control in accordance with aspects of the present disclosure.

FIG. 5 is a diagram 500 illustrating exemplary operation of the power state controller using reinforcement learning to manage a shared resource. In accordance with aspects of the present disclosure, reinforcement learning techniques may be used to determine parameters for controlling the power state in one or more shared resources. The reinforcement learning techniques may comprise a Cross Entropy method, policy gradients, Actor-Critic methods, Trust Region Policy Optimization, Under-Appreciated Reward Exploration, and other reinforcement learning techniques. In the example of FIG. 6, workload component 506 provides workload information from each of the applications may be concatenated and supplied to power state controller 504 for controlling the power state of a shared resource at run-time. In addition, the workload information may also be supplied to a reinforcement learning component 502 for use in parameter training. The parameter training may be conducted off-line or online. The reinforcement learning component 502 may produce a linear map from a feature state to frequencies. The linear map may be expressed as f=As+b, where f is the frequency of the shared resource(s) (e.g., CPU and DDR frequencies), s is the feature state of the subsystems (e.g., Application Processor), and θ=(A,b) are runtime model parameters. In some aspects, the reinforcement learning component 502 may include a linear map for each shared resource.

The $k^{th}$ entry of the runtime model parameters θ at iteration t may be drawn according to the following distribution:

$$p_{k,t} \sim N(\mu_{k,t}, \sigma_{k,t}^2),$$

where $\mu_{k,t}, \sigma_{k,t}^2$ are the mean and standard deviation of the model parameters θ at iteration t. The model parameters may be initialized according to a random value or other initial value (e.g., 1), for example. Using the model parameters, an operating parameter for a shared device may be determined. In turn, the shared device executes a given workload. Following each iteration, the power and performance may be determined based on the workload. This process may be repeated for nθ samples of workloads w1, w2, ... wn based on a joint distribution $p_t$ to estimate a cumulative rewards $r_t$ on training set S(w1), S(w2), ... S(wn). In some aspects, the cumulative reward may be determined based on a combination of measured performance (e.g., workload completion time) and power for processing a sequence of given workloads.

After each iteration, the mean and standard deviation may be updated as follows:

$$\mu_{t+1} := \frac{\sum_{i \in I} w_i}{|I|} \quad (1)$$

$$\sigma_{t+1}^2 := \frac{\sum_{i \in I} (w_i - \mu_{t+1})^T (w_i - \mu_{t+1})}{|I|}, \quad (2)$$

where I corresponds to the top ρn values, where ρ is the selection ratio (e.g., 10% values of the parameter set θ). For example, the top ρn values may correspond to model parameters which produce the best (x %) of performance, where performance may include completion time, power consumption, or combination thereof, for instance. In some aspects, an update may be performed for each of the shared resources. Accordingly, at runtime, the power state controller 504 may, for a given workload, compute an operating parameter for each of the shared resources (e.g., CPU and DDR frequencies) based on the features from the subsystems and the model parameters determined using reinforcement learning.

FIG. 6 is a diagram illustrating exemplary architecture 600 for power state control in accordance with aspects of the present disclosure. Referring to FIG. 6, exemplary architecture 600 includes one or more applications 602 operating on a mobile device (e.g., mobile device 150). The applications 602 may include a browser, a video game, or establishing a Wi-Fi connection to a local area network, for example. Each of the applications 602 may interface and communicate with an operating system (e.g., kernel) 604 which may coordinate resources to perform the tasks requested via the applications. The operating system 604 may be configured with components for managing one or more shared resources 606. Each of the applications may request services from one or more shared resources 606 to perform an application-specific task. By way of example only, the shared resources may include a CPU, a DDR, a GPU, a modem, and Wi-Fi component.

In response to a request for services from an applications, state feature acquisition component 608 may extract or otherwise receive the feature state (e.g., cache miss count, CPU frequency) from each subsystem. In some aspects, the feature state may be received from each subsystem associated with the application request for service. The feature state information may be supplied to a frequency determination component 610 to determine a frequency of operation for one or more shared resources based on model parameters (e.g., A, b) retrieved from a models component 614. In some aspects, the frequency of operation may be determined by concatenating the workloads for each of the shared resources. The extracted feature states of the subsystems may be used along with the workloads to learn model parameters. The model parameters may be learned via reinforcement learning techniques for example. The frequency determination component 610 may compute operating parameters for operating each of the shared resources. In some aspects, the operating parameters may be determined to optimize the operation of the shared resources such that the performance is improved (e.g., power consumption or completion time is reduced, efficiency or speed improved). Although, in this example, the operating parameter is frequency, the present disclosure is not so limiting. Rather, other operating parameters may additionally or alternatively be determined, and in some aspects, may be optimized.

The determined frequency(ies), in turn, may be supplied to the frequency control component 612 to manage the operation of one or more of the shared resources 606.

Figure 7:
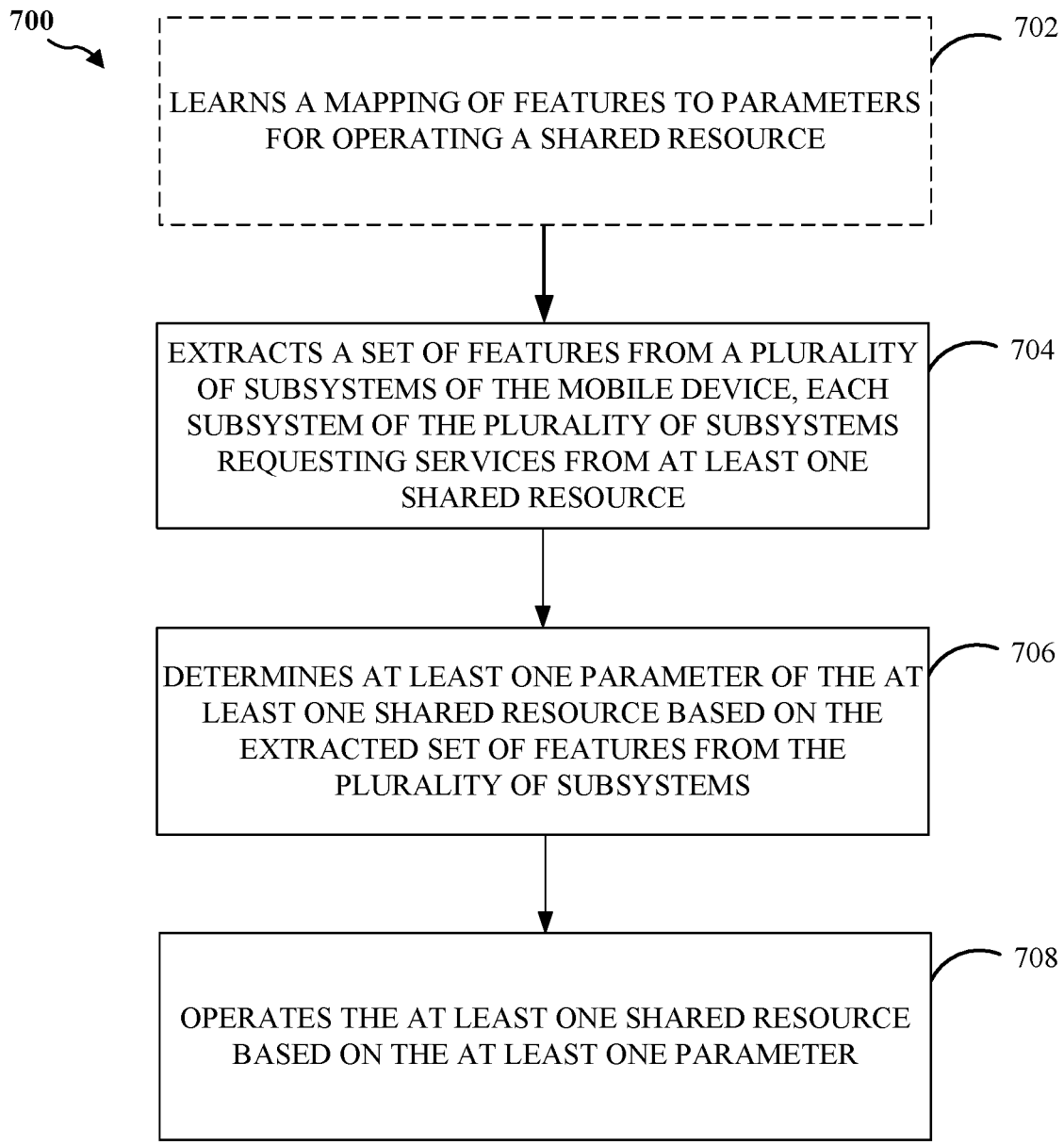
FIG. 7 illustrates a method for operating a shared resource in a mobile device.

FIG. 7 illustrates a method 700 for operating a shared resource in a mobile device in accordance with aspects of the present disclosure. In block 702, the method optionally learns a mapping of features to parameters for operating a shared resource. The mapping may be learned by reinforcement learning techniques which may be linear or non-linear. For example, the mapping may be learned using Reinforcement learning techniques such as the Cross Entropy method, Policy Gradients, Actor-Critic methods, Value iteration methods, Trust Region Policy Optimization, Under-Appreciated Reward Exploration, and other learning techniques (e.g., supervised learning approaches).

In block 704 the method extracts a set of features from a plurality of subsystems of the mobile device. The set of features may be extracted from each subsystem of the plurality of subsystems requesting services from at least one shared resource. As shown in FIG. 1B, shared resource 168 may receive request from services from multiple subsystems (e.g., multimedia subsystem 162, application processor 152 and GPU 166). Each of the subsystems may supply a set of features. The extracted set of features may include a current processor frequency, a number of instructions to be executed by the processor, a processor utilization, a measured bandwidth, or a ratio thereof, for example.

In block 704, the method determines at least one parameter of the at least one shared resource based on the extracted set of features from the plurality of subsystems. For example, as shown in FIG. 6, feature state information from each subsystem may be used by a frequency determination component 610 to determine frequency of operation for one or more shared resources. The frequency determining component may perform a mapping from the extracted features to a model parameter which may in turn be used to calculate an operating parameter for the shared resource.

In some aspects, the parameter (e.g., operating parameter such as CPU frequency) may be learned based on a performance metric associated with a workload and power consumption of the mobile device. The performance metric may comprise a specified target for an application (e.g., a frame rate for video playback or a completion time for processing). In some aspects, the parameter may be learned based on a cumulative reward. The cumulative reward may be based on a combination of measured performance associated with a workload and power consumption for processing a sequence of predetermined workloads. In some aspects, the performance reward may be calculated for every workload and averaged. The power reward, on the other hand may be calculated upon completion of processing the determined workloads. Further, the operation parameters and model parameters may be learned using a neural network such as a DCN 350, for example.

Furthermore, in block 706, the method operates the at least one shared resource based on the at least one parameter. As shown, in the example of FIG. 6, the determined frequency(ies) may be supplied to the frequency control component 612 to manage the operating frequency of the shared resource.

In one configuration, a machine learning model is configured for extracting a set of features from a plurality of subsystems of the mobile device, each subsystem of the plurality of subsystems requesting services from at least one shared resource of the mobile device. The machine learning model is also configured for determining at least one parameter of the at least one shared resource based on the extracted set of features from the plurality of subsystems. Additionally, the machine learning model is configured for operating the at least one shared resource based on the at least one parameter. The model includes a extracting means, determining means, and/or operating means. In one aspect, the extracting means, determining means, and/or operating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 700 may be performed by the SOC 100 (FIG. 1) or the system 200 (FIG. 2). That is, each of the elements of method 700 for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of operating a shared resource in a mobile device, comprising:
   extracting a set of features from a plurality of subsystems of the mobile device, each subsystem of the plurality of subsystems requesting services from at least one shared resource of the mobile device, wherein the plurality of subsystems and the at least one shared resource are hardware components;
   processing a workload from the plurality of subsystems, wherein the workload comprises a desired level of performance for a specified task;
   determining at least one parameter of the at least one shared resource based on the extracted set of features and the workload from the plurality of subsystems;
   operating the at least one shared resource based on the at least one parameter; and
   wherein the at least one shared resource comprises a processor and the extracted set of features includes at least one of a current processor frequency, a number of instructions to be executed by the processor, a processor utilization, a measured bandwidth, or a ratio thereof.

2. The method of claim 1, wherein the at least one parameter is learned based at least in part on a performance metric associated with the workload and power consumption of the mobile device.

3. The method of claim 1, wherein the at least one parameter is learned based at least in part on a cumulative reward, the cumulative reward comprising a combination of measured performance associated with the workload and power consumption for processing a sequence of predetermined workloads.

4. An apparatus of operating a shared resource in a mobile device, comprising:
   a memory; and
   at least one processor coupled to the memory, the at least one processor being configured to:
      extract a set of features from a plurality of subsystems of the mobile device, each subsystem of the plurality of subsystems requesting services from at least one shared resource of the mobile device, wherein the plurality of subsystems and the at least one shared resource are hardware components;
      process a workload from the plurality of subsystems, wherein the workload comprises a desired level of performance for a specified task;
      determine at least one parameter of the at least one shared resource based on the extracted set of features and the workload from the plurality of subsystems; and
      operate the at least one shared resource based on the at least one parameter; and
      wherein the at least one shared resource comprises a processor and the extracted set of features includes at least one of a current processor frequency, a number of instructions to be executed by the processor, a processor utilization, a measured bandwidth, or a ratio thereof.

5. The apparatus of claim 4, wherein the at least one processor is further configured to learn the at least one parameter based at least in part on a performance metric associated with the workload and power consumption of the mobile device.

6. The apparatus of claim 4, wherein the at least one processor is further configured to learn the at least one parameter based at least in part on a cumulative reward, the cumulative reward comprising a combination of measured performance associated with the workload and power consumption for processing a sequence of predetermined workloads.

7. An apparatus for operating a shared resource in a mobile device, comprising:
   means for extracting a set of features from a plurality of subsystems of the mobile device, each subsystem of the plurality of subsystems requesting services from at least one shared resource of the mobile device, wherein the plurality of subsystems and the at least one shared resource are hardware components;
   means for processing a workload from the plurality of subsystems, wherein the workload comprises a desired level of performance for a specified task;
   means for determining at least one parameter of the at least one shared resource based on the extracted set of features and the workload from the plurality of subsystems;
   means for operating the at least one shared resource based on the at least one parameter; and
   wherein the at least one shared resource comprises a processor and the extracted set of features includes at least one of a current processor frequency, a number of instructions to be executed by the processor, a processor utilization, a measured bandwidth, or a ratio thereof.

8. The apparatus of claim 7, further comprising means for learning the at least one parameter based at least in part on a performance metric associated with the workload and power consumption of the mobile device.

9. The apparatus of claim 7, further comprising means for learning the at least one parameter based at least in part on a cumulative reward, the cumulative reward comprising a combination of measured performance associated with the workload and power consumption for processing a sequence of predetermined workloads.

10. A non-transitory, computer-readable medium storing computer executable code for operating a shared resource in a mobile device, comprising code to:
   extract a set of features from a plurality of subsystems of the mobile device, each subsystem of the plurality of subsystems requesting services from at least one shared resource of the mobile device, wherein the plurality of subsystems and the at least one shared resource are hardware components;
   process a workload from the plurality of subsystems, wherein the workload comprises a desired level of performance for a specified task;
   determine at least one parameter of the at least one shared resource based on the extracted set of features and the workload from the plurality of subsystems; and
   operate the at least one shared resource based on the at least one parameter; and
   wherein the at least one shared resource comprises a processor and the extracted set of features includes at least one of a current processor frequency, a number of instructions to be executed by the processor, a processor utilization, a measured bandwidth, or a ratio thereof.

11. The non-transitory, computer-readable medium of claim 10, further comprising code learn the at least one parameter based at least in part on a performance metric associated with the workload and power consumption of the mobile device.

12. The non-transitory, computer-readable medium of claim 10, further comprising code to learn the at least one parameter based at least in part on a cumulative reward, the cumulative reward comprising a combination of measured performance associated with the workload and power consumption for processing a sequence of predetermined workloads.

* * * * *